(12) United States Patent
Funado et al.

(10) Patent No.: US 8,537,235 B2
(45) Date of Patent: Sep. 17, 2013

(54) COMPUTER-READABLE COMPUTER PROGRAM PRODUCT CONTAINING IMAGE PROCESSING PROGRAM AND DIGITAL CAMERA

(75) Inventors: Tarou Funado, Tokyo (JP); Yuji Nakao, Kawasaki (JP); Hiroki Uwai, Yokohama (JP); Takashi Fukazawa, Yokohama (JP); Shoei Nakamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 111 days.

(21) Appl. No.: 12/697,736

(22) Filed: Feb. 1, 2010

(65) Prior Publication Data
US 2010/0194909 A1    Aug. 5, 2010

(30) Foreign Application Priority Data

Feb. 5, 2009   (JP) ................................. 2009-025038

(51) Int. Cl.
*H04N 5/228*   (2006.01)
*G06K 9/00*    (2006.01)

(52) U.S. Cl.
USPC .......................... 348/222.1; 382/162; 382/167

(58) Field of Classification Search
USPC ......... 382/274, 276, 284, 190–231, 162–167; 348/222.1, 239
See application file for complete search history.

(56) References Cited

U.S. PATENT DOCUMENTS

| | | | |
|---|---|---|---|
| 6,996,287 B1 * | 2/2006 | Weiss | 382/260 |
| 7,129,980 B1 * | 10/2006 | Ashida | 348/333.04 |
| 7,755,681 B2 * | 7/2010 | Lee | 348/254 |
| 7,808,478 B2 * | 10/2010 | Choi et al. | 345/158 |
| 7,864,226 B2 * | 1/2011 | Asada | 348/231.99 |
| 8,300,989 B2 * | 10/2012 | Watari et al. | 382/309 |
| 2002/0041707 A1 * | 4/2002 | Newman | 382/167 |
| 2002/0141005 A1 * | 10/2002 | Okisu et al. | 358/540 |

(Continued)

FOREIGN PATENT DOCUMENTS

| | | |
|---|---|---|
| JP | A-2000-222465 | 8/2000 |
| JP | A-2004-080401 | 3/2004 |

(Continued)

OTHER PUBLICATIONS

Extended European Search Report dated Jul. 1, 2010 issued in European Patent Application No. 10152317.3.

(Continued)

*Primary Examiner* — Roberto Velez
*Assistant Examiner* — Pritham Prabhakher
(74) *Attorney, Agent, or Firm* — Oliff & Berridge, PLC

(57) ABSTRACT

A computer-readable computer program product contains an image processing program which includes: an instruction for displaying a sample image and a correction object image on a display device; an instruction for setting a sample area in an area of the sample image; an instruction for receiving an operation signal which is output by an input device in response to an operation in which the sample area is dragged and dropped into an area of the correction object image; an instruction for setting correction coordinates in the area of the correction object image based upon the operation signal and for associating the sample area with the correction coordinates; an instruction for setting a correction area in the area of the correction object image based upon the correction coordinates; and an instruction for performing a color correction to an image of the correction area based upon the sample area.

12 Claims, 12 Drawing Sheets

(56) References Cited

U.S. PATENT DOCUMENTS

| | | | |
|---|---|---|---|
| 2004/0070619 A1 | 4/2004 | Yoshio et al. | |
| 2004/0165787 A1* | 8/2004 | Perez et al. | 382/284 |
| 2004/0258302 A1* | 12/2004 | Miwa et al. | 382/167 |
| 2005/0212819 A1 | 9/2005 | Kubo et al. | |
| 2007/0222789 A1 | 9/2007 | Yoshio et al. | |
| 2008/0239104 A1* | 10/2008 | Koh | 348/240.99 |
| 2008/0292138 A1* | 11/2008 | Watari et al. | 382/100 |
| 2008/0317375 A1* | 12/2008 | Huan et al. | 382/274 |

FOREIGN PATENT DOCUMENTS

| | | | |
|---|---|---|---|
| JP | A-2004-310499 | | 11/2004 |
| JP | A-2005-227547 | | 8/2005 |
| JP | A-2005-286653 | | 10/2005 |
| JP | 2007-53543 | * | 3/2007 |
| JP | A-2007-53543 | | 3/2007 |

OTHER PUBLICATIONS

Apr. 2, 2013 Japanese Office Action issued in Application No. 2009-025038 (with English-language Translation).

Jun. 25, 2013 Notification of Reasons for Refusal issued in Japanese Application No. 2009-025038 with English-language translation.

* cited by examiner

FIG.4A
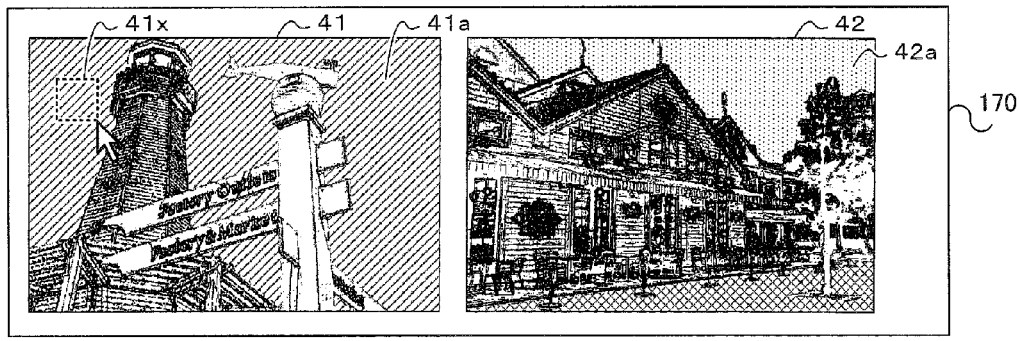
FIG.4B
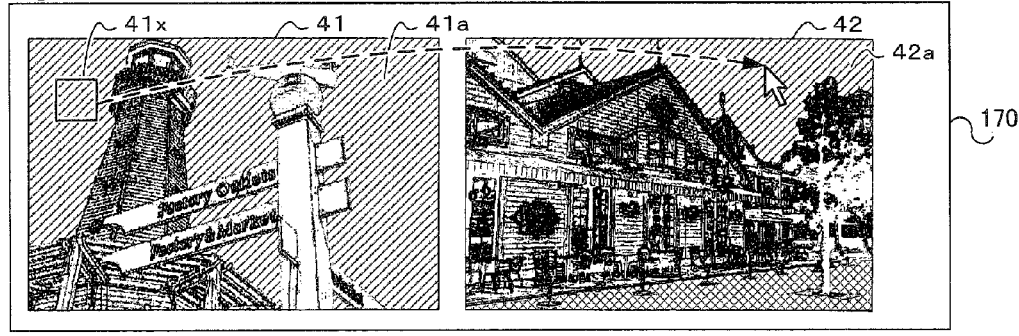
FIG.4C
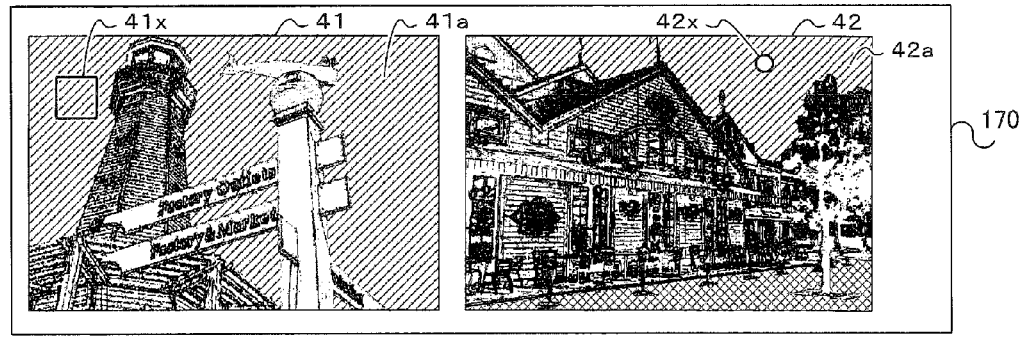
FIG.4D
| SAMPLE IMAGE FILE NAME | TARGET COLOR AREA | CORRECTION OBJECT IMAGE FILE NAME | DROP POINT |
|---|---|---|---|
| DSCN0001.JPG | (200, 300) - (500, 600) | DSCN0002.JPG | (2200, 200) |

US 8,537,235 B2

COMPUTER-READABLE COMPUTER PROGRAM PRODUCT CONTAINING IMAGE PROCESSING PROGRAM AND DIGITAL CAMERA

INCORPORATION BY REFERENCE

The disclosure of the following priority application is herein incorporated by reference: Japanese Patent Application No. 2009-025038 filed Feb. 5, 2009.

BACKGROUND OF THE INVENTION

1. Field of the Invention

The present invention relates to a computer-readable computer program product containing an image processing program to perform color correction to an image, and a digital camera.

2. Description of Related Art

There are an image processing device that performs color correction so as to render the color tone desired by a user to a digital image created by a digital camera or the like. This type of image processing device is used so as to unify color tones of a plurality of images. For example, Japanese Laid Open Patent Publication No. 2007-53543 discloses an image processing device that modifies the color tone of the original image using a color designated through an image for target color designation.

SUMMARY OF THE INVENTION

Under the conventional technology, an operation to unify the color tones of a plurality of correction object images is an unintuitive operation to separately designate an area of an image for target color designation and that of a correction object image.

According to the 1st aspect of the present invention, a computer-readable computer program product contains an image processing program. The image processing program comprises: an image display instruction for displaying a sample image and a correction object image on a display device; a sample area set instruction for setting a sample area in an area of the sample image; a reception instruction for receiving an operation signal which is output by an input device in response to an operation in which the sample area is dragged and dropped into an area of the correction object image; an association instruction for setting correction coordinates in the area of the correction object image based upon the operation signal having been received by the reception instruction and for associating the sample area of the sample image with the correction coordinates in the area of the correction object image; a correction area set instruction for setting a correction area in the area of the correction object image based upon the correction coordinates; and a first color correction instruction for performing a color correction to an image of the correction area based upon the sample area of the sample image associated with the correction area.

According to the 2nd aspect of the present invention, in the computer-readable computer program product according to the 1st aspect, it is preferred that the correction area set instruction includes a provisional setting of the correction area based upon a position output from the input device while the sample area is being dragged; the first color correction instruction includes a performance of the color correction to the image of the correction area having been provisionally set by the correction area set instruction; and the image display instruction includes a display of the correction object image in which the color correction has been performed by the first color correction instruction.

According to the 3rd aspect of the present invention, in the computer-readable computer program product according to the 1st aspect, it is preferred that the image processing program further comprises: a modification instruction for modifying the correction coordinates. The correction area set instruction includes a setting of the correction area based upon the correction coordinates modified by the modification instruction.

According to the 4th aspect of the present invention, in the computer-readable computer program product according to the 1st aspect, it is preferred that based upon the correction coordinates, the correction area set instruction includes a detection of an area in which at least one of texture, color, and brightness is same and a setting thereof as the correction area.

According to the 5th aspect of the present invention, in the computer-readable computer program product according to the 1st aspect, it is preferred that the first color correction instruction includes a performance of the color correction so that a color tone of the correction area is same as a color tone of the sample area.

According to the 6th aspect of the present invention, in the computer-readable computer program product according to the 1st aspect, it is preferred that the image processing program further comprises: a first change detection instruction for detecting a change in a color tone of the sample area; and a second color correction instruction for performing a color correction based upon the sample area to all correction areas in which an association with the sample area has been performed in response to a detection of the change by the first change detection instruction.

According to the 7th aspect of the present invention, in the computer-readable computer program product according to the 1st aspect, it is preferred that the image processing program further comprises: a second change detection instruction for detecting a change in a color tone of the correction area; a third color correction instruction for performing a color correction based upon the correction area to the sample image related to the correction area in response to a detection of the change by the second change detection instruction; a fourth color correction instruction for performing a color correction based upon the sample area to correction areas of all correction object images related to the sample area of the sample image based upon the color correction by third color correction instruction.

According to the 8th aspect of the present invention, in the computer-readable computer program product according to the 7th aspect, it is preferred that the image processing program further comprises: a selection instruction for selecting a correction object image to which the color correction by the fourth color correction instruction is not performed among a plurality of correction object images that have been associated with the sample area of the sample image based upon an input from the input device after the color correction by the third color correction instruction.

According to the 9th aspect of the present invention, in the computer-readable computer program product according to the 8th aspect, it is preferred that the image processing program further comprises: a dissociation instruction for putting all correction object images having been selected by the selection instruction into a state of being not associated with the sample area of the sample image.

According to the 10th aspect of the present invention, in the computer-readable computer program product according to the 6th aspect, it is preferred that the image processing program further comprises: a second change detection instruction for detecting a change in a color tone of the correction; a third color correction instruction for performing a color correction based upon the correction area to the sample image related to the correction area in response to a detection of the change by the second change detection instruction; a fourth color correction instruction for performing a color correction based upon the sample area to the correction area other than the correction area in which the change has been detected by the second change detection instruction among correction areas of all correction object images related to the sample area of the sample image based upon the color correction by the third color correction instruction; and a switch instruction for alternately switching the first change detection instruction and the second change detection instruction.

According to the 11th aspect of the present invention, in the computer-readable computer program product according to the 1st aspect, it is preferred that a plurality of sample images are displayed as thumbnails on the display device by the image display instruction.

According to the 12th aspect of the present invention, in the computer-readable computer program product according to the 1st aspect, it is preferred that the image processing program further comprises: a grouping instruction for creating a group by grouping a plurality of correction object images; a group display instruction for displaying a symbol representing the group on the display device; and an automatic set instruction for automatically setting the correction area to each of the plurality of correction object images included in the group. The association instruction associates the sample area with the correction area that has been set by the automatic set instruction based upon a drag and drop operation to the symbol of the sample area by the input device.

According to the 13th aspect of the present invention, a digital camera executes the image processing program contained in the computer-readable computer program product according to the 1st aspect.

BRIEF DESCRIPTION OF THE DRAWINGS

FIGS. 4A to 4D illustrate a sample image and a correction object image that are associated by an image processing device 1.

DESCRIPTION OF PREFERRED EMBODIMENTS

—The First Embodiment—

Figure 1:
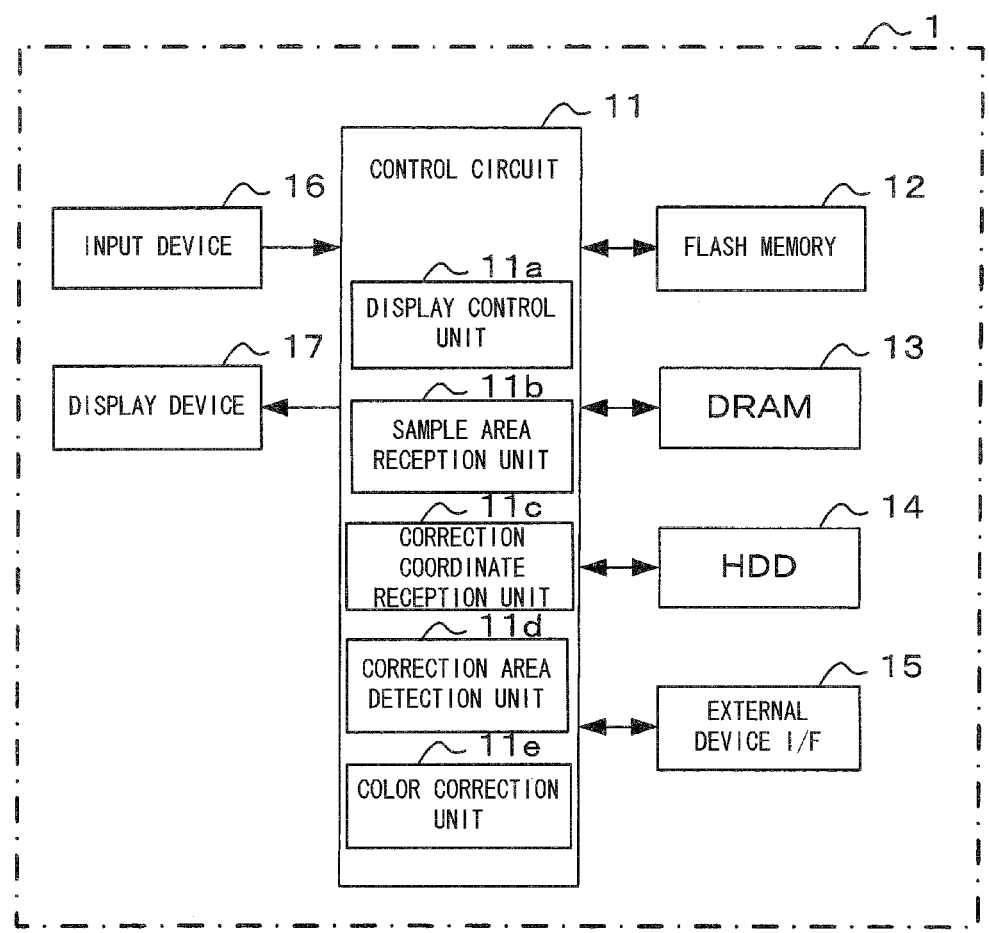
FIG. 1 is a block diagram showing a circuit configuration of the image processing device in the present embodiment.

FIG. 1 is a block diagram showing the circuit configuration of the image processing device in the present embodiment. The image processing device 1 according to the present embodiment performs color correction so as to unify the color tones of a plurality of images.

The image processing device 1 includes the control circuit 11, a flash memory 12, a DRAM 13, an HDD 14, an external device interface (I/F) 15, an input device 16, and the display device 17. The flash memory 12 is a nonvolatile storage device that stores therein a predetermined control program executed by the control circuit 11. The DRAM 13 is used to temporarily store the data used by a control program. As described later, the control program contains an image processing program. In the HDD 14, an image file on which image processing is to be performed by the image processing device 1 and an image file on which image processing has been performed by the image processing device 1 are stored.

The external device I/F 15 is an interface to connect with an external device such as a digital camera. The control circuit 11 loads a captured image file stored in the external device from the external device such as a digital camera connected to the external device I/F 15 into the HDD 14. The input device 16 may be a variety of input devices such as a keyboard and a mouse, and the display device 17 may be a variety of display devices such as a liquid-crystal display.

The control circuit 11 includes a display control unit 11a, a sample area reception unit 11b, a correction coordinate reception unit 11c, a correction area detection unit 11d, and a color correction unit 11e. These function units are performed by the control circuit 11 executing the predetermined control program stored in the flash memory 12.

Based upon image data stored in the DRAM 13, the display control unit 11a controls the display device 17 so as to display an image thereon. The image data used by the display control unit 11a, being contained in a image file read out from the HDD 14 by the control circuit 11, is stored in the DRAM 13. The sample area reception unit 11b receives an operation signal that in response to a range selection operation the input device 16 outputs. The correction coordinate reception unit 11c receives an operation signal that in response to a drag and drop operation the input device 16 outputs. Based upon the operation signal received by the correction coordinate reception unit 11c, the correction area detection unit 11d detects an area in which a color correction is performed. The color correction unit 11e performs the color correction based upon the operation signal received by the sample area reception unit 11b upon the area detected by the correction area detection unit 11d.

Figure 2:
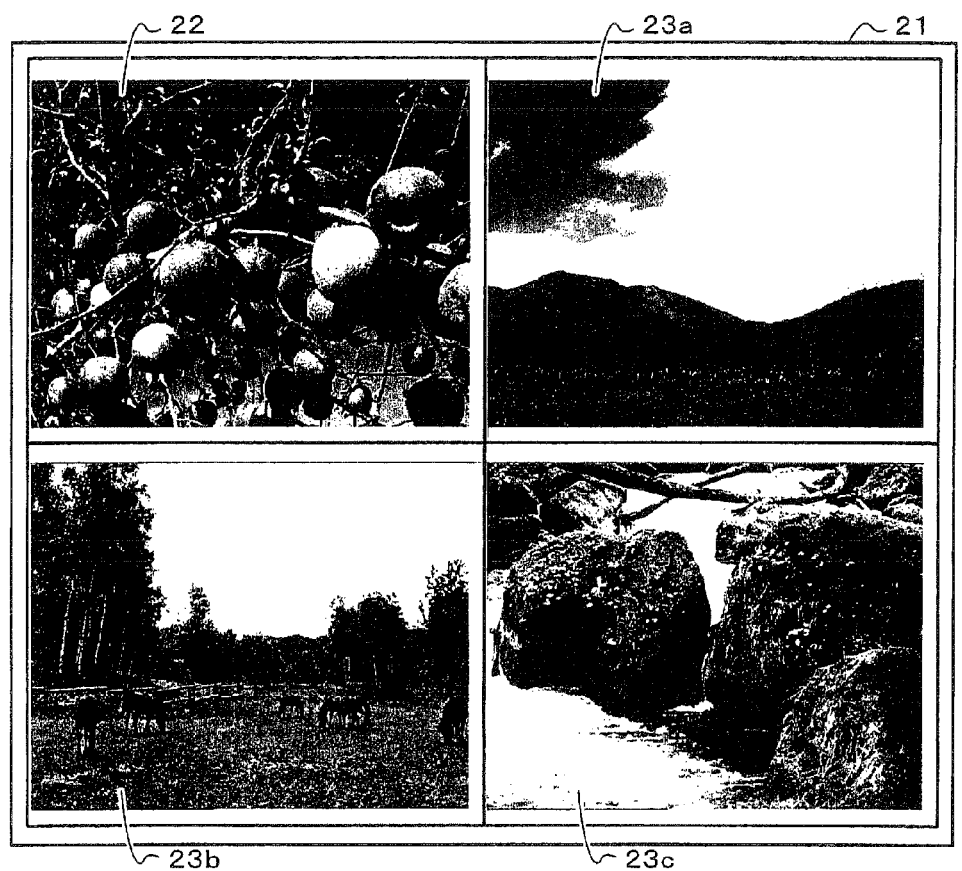
FIG. 2 is an example of a screen displayed by a control circuit 11 on a display device 17 when performing a color correction.

FIG. 2 is an example of a screen displayed by the control circuit 11 on the display device 17 when performing a color correction. A display screen 21 presented in FIG. 2 includes four images 22, 23a, 23b, and 23c. Based upon the four image files stored in the HDD 14, the display control unit 11a displays the four images 22, 23a, 23b, and 23c on the display device 17.

When performing a color correction, the user selects an image file upon which the color correction is based from among a plurality of image files stored in the HDD 14. The image file is referred to as a sample image file, and the image displayed based upon the sample image file is referred to as a sample image. On the display screen 21 shown in FIG. 2, the image 22 is the sample image.

After selecting the sample image file, the user selects an image file that is subjected to the color correction. The image file is referred to as a correction object image file, and the image displayed based upon the correction object image file is referred to as a correction object image. On the display screen 21 shown in FIG. 2, the images 23a, 23b, and 23c are the correction object images. The user performs an operation for color correction based upon a screen on which a sample image and a correction object image are displayed as the display screen 21 shown in FIG. 2.

Figure 3:
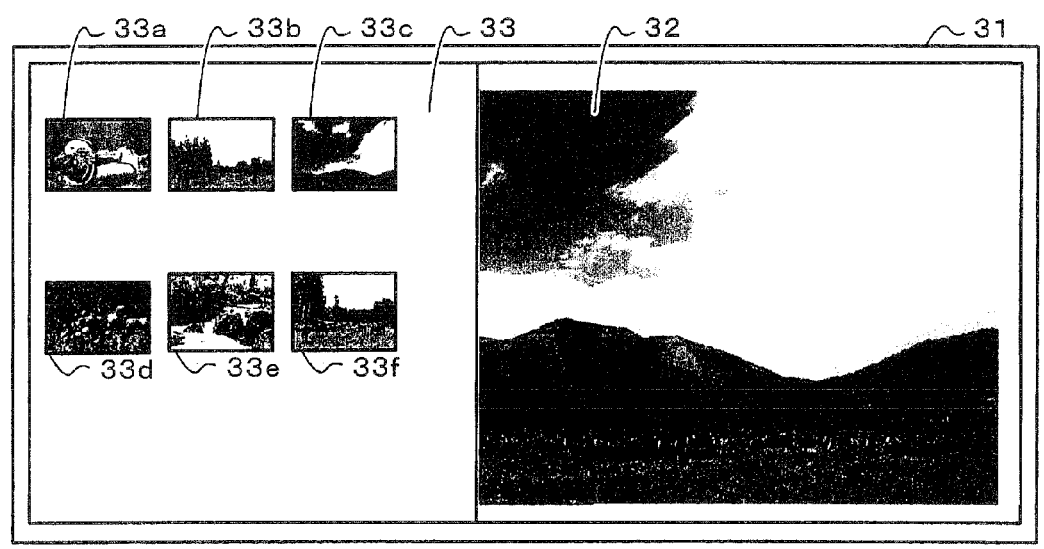
FIG. 3 is an example of a thumbnail display screen displayed by the control circuit 11 on the display device 17 when performing a color correction.

FIG. 3 is an example of a screen (thumbnail) displayed by the control circuit 11 on the display device 17 when performing a color correction. A display screen 31 shown in FIG. 3 is provided with a sample image display area 32 and a thumbnail display area 33. On the thumbnail display area 33, correction object images 33a, 33b, 33c, 33d, 33e, and 33f are displayed. The display control unit 11a can thus display one or more correction object images on the display device 17 as thumbnails.

Next, the color correction operation performed between a sample image and a correction object image will be explained. Based upon an operation signal output by the input device 16, the image processing device 1 associates a part of the area of the sample image with a point of the correction object image. Then, the image processing device 1 performs a color correction based upon the association. The image processing device 1 can also associate one area of the sample image with a plurality of correction object images. In addition, the image processing device 1 can repeat the association a plurality of times. For instance, a plurality of points associated by the image processing device 1 with areas of a plurality of sample images can be set in one correction object image.

FIGS. 4A to 4D illustrate a sample image and a correction object image that are associated by the image processing device 1. The explanation below assumes that the display device 17 displays a sample image 41 and a correction object image 42 on a screen 170 during color correction operation. Although the sample image 41 and the correction object image 42 are displayed horizontally on the screen 170, the display format is not limited thereto. Now, an operation for unifying the color tone of the sky of the sample image 41 (the area denoted by the reference numeral 41a) and that of the correction object image 42 (the area denoted by the reference numeral 42a) by means of a color correction.

At first, the image processing device 1 selects a rectangular area upon which the color correction is based from the area of the sample image 41. The selection of the rectangular area is performed based upon an operation signal output from the input device 16. In FIG. 4A, a rectangular frame 41x is displayed as a result of the operation signal for setting the rectangular frame 41x on the area denoted by the reference numeral 41a having been input from the input device 16 to the control circuit 11 in response to an instruction from the user so as to apply the color tone of the area denoted by the reference numeral 41a to the correction object image 42. The operation signal is input to the sample area reception unit 11b.

Next, an operation signal indicating a drag and drop operation of the rectangular frame 41x into a point in the area of the correction object image 42 is output from the input device 16 to the control circuit 11 in response to an instruction from the user. FIG. 4B presents the rectangular frame 41x being dragged to a point in the area denoted by the reference numeral 42a so as to correct the color tone therein. At this time, a preceding result of a color correction performed in the event that the rectangular frame 41x is dropped at a cursor position is displayed on the screen 170. In other words, the user moves the cursor with the rectangular frame 41x holding the dropping state so as to view the result of the color correction performed in the event that it is dragged to the current cursor position before actually dropping it.

The operation signal indicating the drag and drop operation is input to the correction coordinate reception unit 11c. As a result, the screen 170 shown in FIG. 4C is displayed on the display device 17 eventually. In FIG. 4C, a correction is performed so that the area 42a, having a uniform texture and tone around the point to which the rectangular frame 41x was dragged and dropped, has the same color tone as that of the sample area boxed by the rectangular frame 41x of the sample image 41. At the point to which the rectangular frame 41x was dragged and dropped, a marker 42x is displayed so as to indicate that the point is associated with the sample area indicated by the rectangular frame 41x of the sample image 41.

At this time, the control circuit 11 stores data 43 shown in FIG. 4D into the DRAM 13. The data 43 contains a sample image file name 43a, coordinates 43b of the sample area having been selected from the sample image, a correction object image file name 43c, and coordinates 43d of the point at which the rectangular frame 41x is dragged and dropped.

As described earlier, the image processing device 1 can associate one sample area selected from one sample image with a plurality of correction object images. For example, when the user drags and drops the rectangular frame 41x into yet another correction object image, a new marker is located on the correction object image and the color tone of the area in which the marker is located is corrected based upon the sample area boxed by the rectangular frame 41x. The user is allowed to repeat the operation for a plurality of correction object image.

Figure 5A:
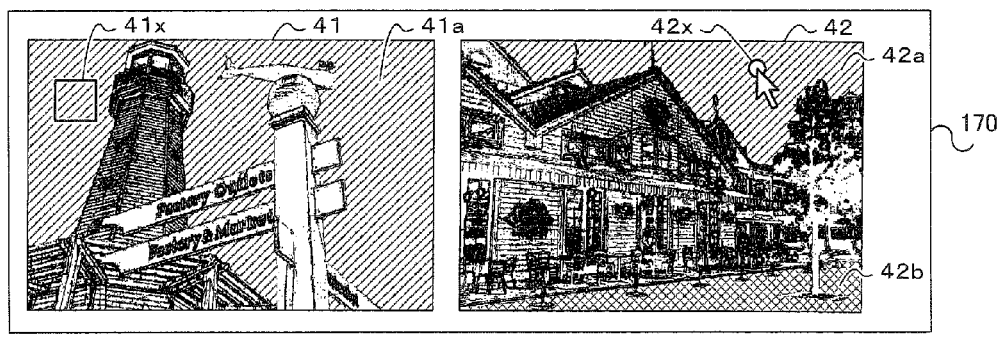
FIGS. 5A to 5C illustrate additional color correction operations on the correction object image.
Figure 5B:
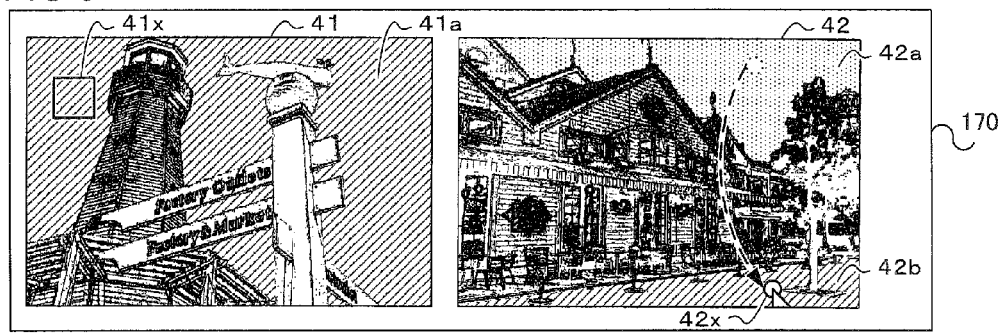
Figure 5C:
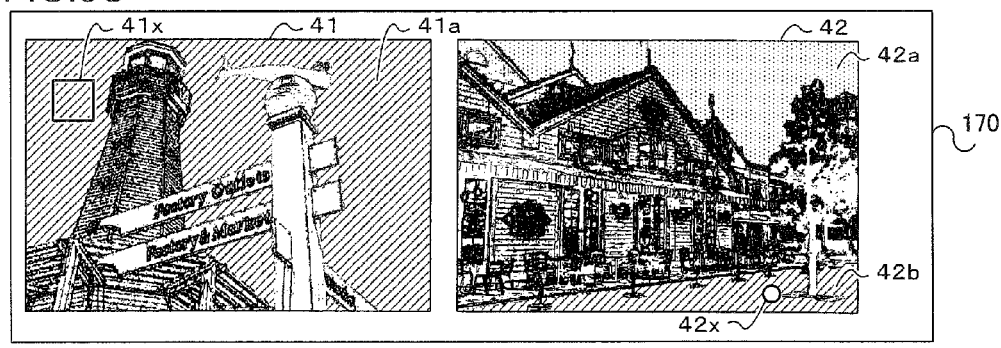

FIGS. 5A to 5C illustrate additional color correction operations on the correction object image. The explanation below assumes that the display device 17 displays the sample image 41 and the correction object image 42 on the screen 170. Although the sample image 41 and the correction object image 42 are displayed horizontally on the screen 170, the display format is not limited thereto. After performing the color correction operation described above so as to proceed the flow of process to the state shown in FIG. 4C, the user can modify the area to which the color correction is applied in the correction object image.

At first, as shown in FIG. 5A, the control circuit 11 moves the mouse cursor to the position of the marker 42x in response to an instruction from the user. Next, an operation signal indicating the drag and drop operation of the marker 42x to the area to which the user desires to apply the color correction is output from the input device 16 to the control circuit 11 in response to an instruction from the user. FIG. 5B presents the marker 42x existed in the area 42a being dragged to an area 42b (the ground included in the correction object image 42). Also at this time, similar to FIG. 4B, the result of the color correction performed in the event that the marker 42x is dropped at the current cursor position is immediately reflected on the screen 170. When the control circuit 11 drops the marker 42 based upon the operation signal, the display screen becomes the one shown in FIG. 5C. In FIG. 5C, the area 42a, on which the marker 42x originally existed, has been restored to the state before the color correction operation was performed. On the other hand, the area 42b, to which the marker 42x has been newly dropped, has the same color tone as that of the sample area of the sample image 41.

Figure 6A:
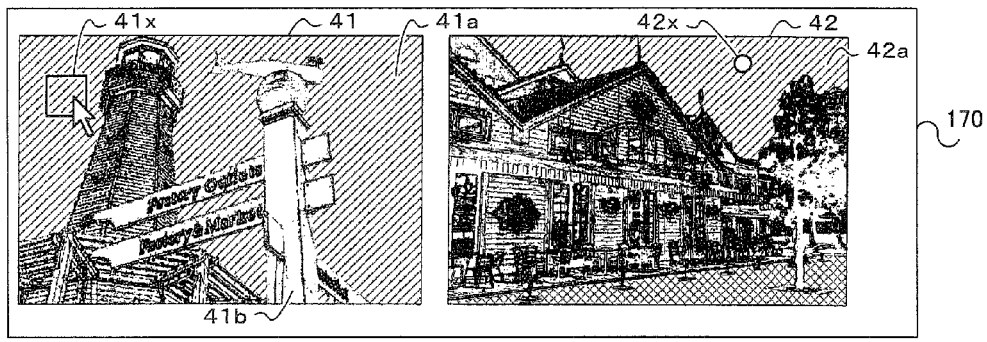
FIGS. 6A to 6C illustrate additional color correction operations on the sample image.
Figure 6B:
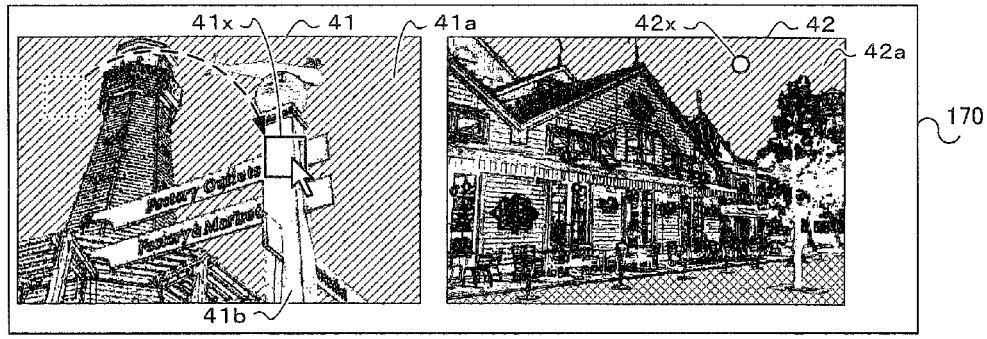
Figure 6C:
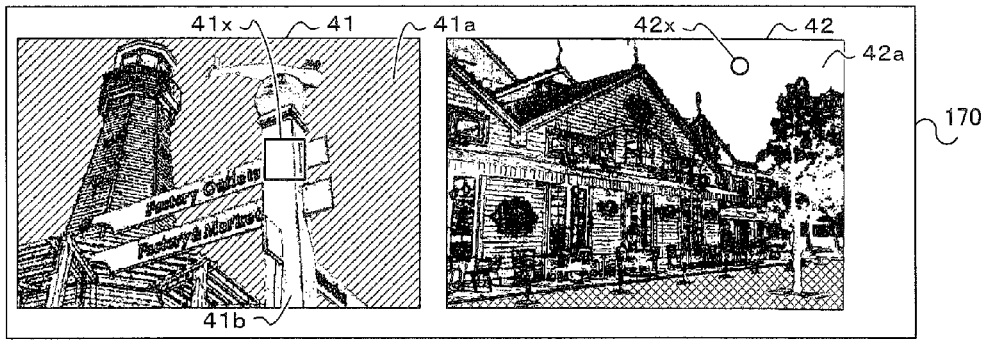

FIGS. 6A to 6C illustrate additional color correction operations on the sample image. The explanation below assumes that the display device 17 displays the sample image 41 and the correction object image 42 on the screen 170. Although the sample image 41 and the correction object image 42 are displayed horizontally on the screen 170, the display format is not limited thereto. Similar to FIGS. 5A to 5C, the sample area in the sample image can be modified by performing additional operations from the state shown in FIG. 4C.

At first, as shown in FIG. 6A, the control circuit 11 moves the mouse cursor to the position of the rectangular frame 41x in response to an instruction from the user. Next, as shown in FIG. 6B, an operation signal indicating the drag and drop operation of the rectangular frame 41x into the area 41b (the pillar contained in the sample image 41), which the user desires to designate as a sample area, is output from the input device 16 to the control circuit 11 in response to an instruction from the user. The result of the operation is shown in FIG. 6C. In FIG. 6C, the color tone of the area 42a, on which the marker 42x exists, is corrected to that of not the area 41a but the area 41b.

In addition, in the event that one sample image is associated with a plurality of correction object images and the correction object images are displayed as thumbnails, the additional color correction operations shown in FIGS. 6A to 6C performed by the user cause the result of the additional color correction operations to be reflected at a time on the plurality of correction object images displayed as thumbnails by the control circuit 11.

Figure 7A:
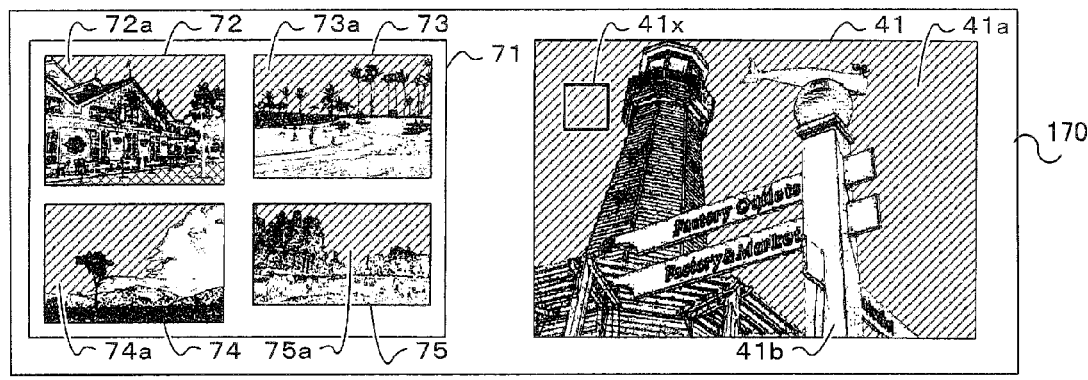
FIGS. 7A to 7C illustrate effects of the additional color correction operations on the sample image on thumbnails.
Figure 7B:
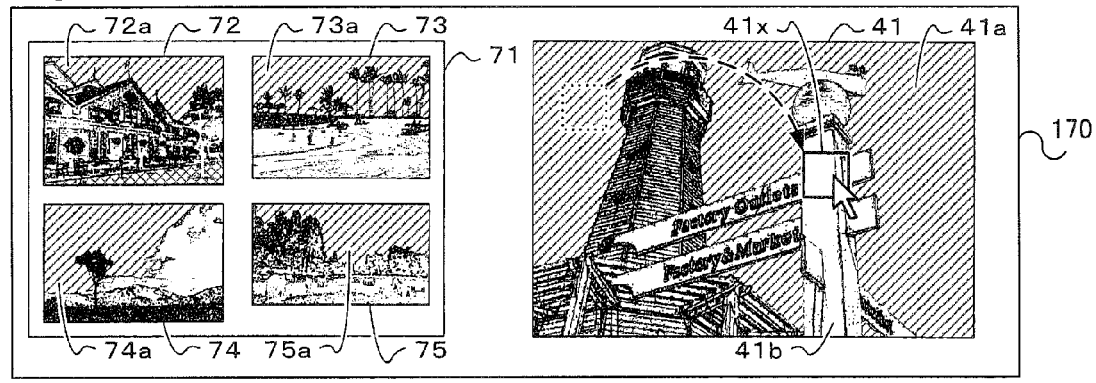
Figure 7C:
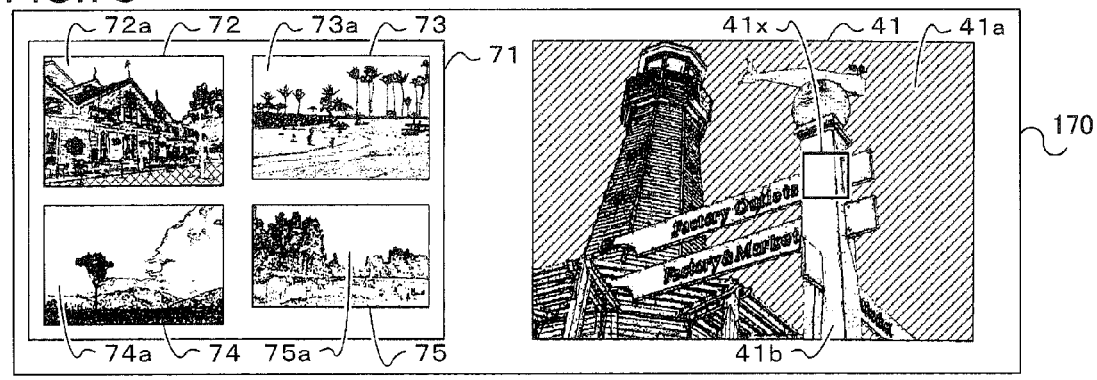

FIGS. 7A to 7C illustrate effects of the additional color correction operations on the sample image on thumbnails. As shown in FIGS. 7A to 7D, the screen 170 of the display device 17 is provided with a sample image display area of the sample image 41 and a thumbnail display area 71. The explanation below assumes that the display device 17 displays the sample image display area of the sample image 41 and the thumbnail display area 71 on the screen 170. Although the sample image display area of the sample image 41 and the thumbnail display area 71 are displayed horizontally on the screen 170, the display format is not limited thereto. In FIG. 7A, on the thumbnail display area 71 correction object images 72, 73, 74, and 75 are displayed as thumbnails. Areas 72a, 73a, 74a, and 75a, on which those images are displayed, are associated with the sample area boxed by the rectangular frame 41x of the sample image 41. In other words, the color tones of the areas 72a, 73a, 74a, and 75a are corrected into those of the sample areas boxed by the rectangular frame 41x.

With the screen of FIG. 7A being displayed, when an operation signal indicating the drag and drop operation of the rectangular frame 41x into the area 41b as shown in FIG. 7B is input to the control circuit 11, the modifications in the sample area are reflected at a time as shown in FIG. 7C on the correction object images 72, 73, 74, and 75, displayed in the thumbnail display areas.

Next, the case in which a plurality of sample images are used will be explained. As described earlier, the image processing device 1 can select a sample area from a plurality of sample images so as to perform a color correction for one correction object image. In the event that a plurality of sample images are handled in this manner, the image processing device 1 can display a plurality of sample images as thumbnails in a row in a palette display area.

Figure 8:
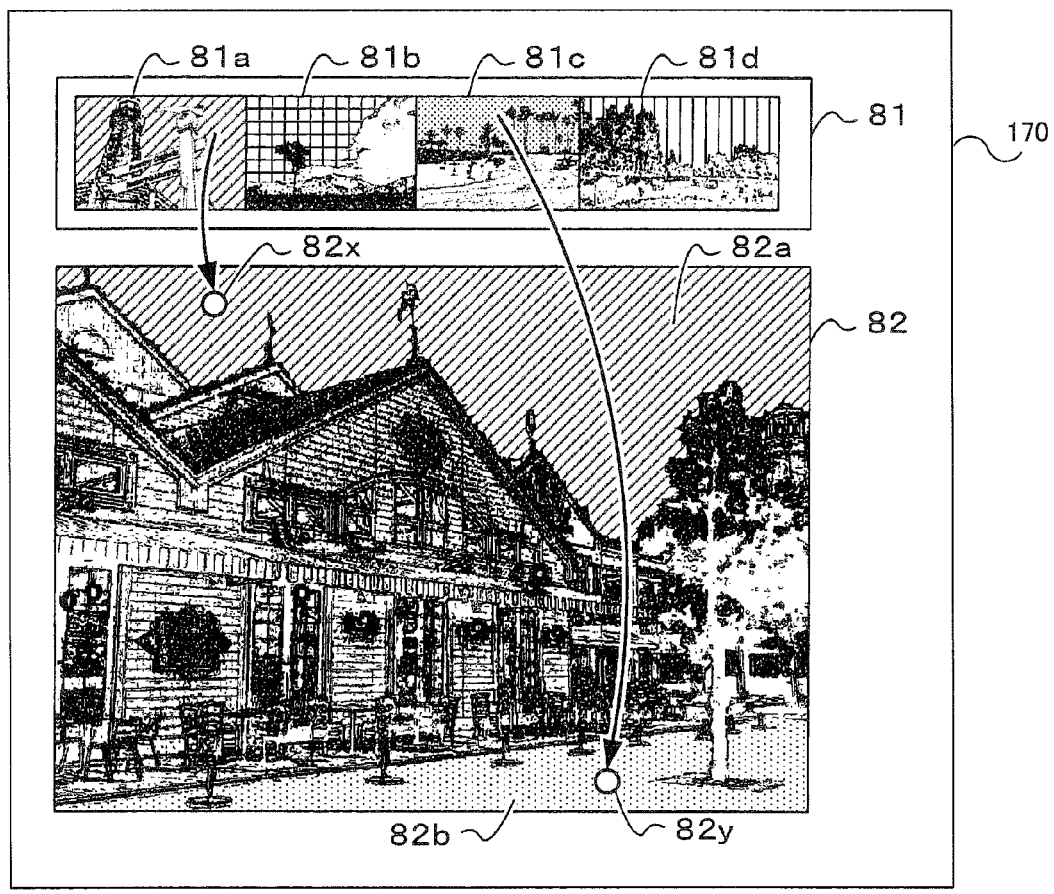
FIG. 8 is an example of a screen on which a plurality of sample images are displayed in palette.

FIG. 8 is an example of a screen on which a plurality of sample images are displayed in palette. The screen shown in FIG. 8 is provided with a palette display area 81 and a correction object image display area 82. The explanation below assumes that the display device 17 displays the palette display area 81 and the correction object image display area 82 on the screen 170. Although the palette display area 81 and the correction object image display area 82 are displayed vertically on the screen 170, the display format is not limited thereto. On the palette display area 81, sample images 81a, 81b, 81c, and 81d are displayed as thumbnails in a horizontal row.

Based upon a plurality of sample images, a color correction is performed on the correction object image 82. A marker 82x indicates that a color correction is being performed based upon the sample area of the sample image 81a. A marker 82y indicates that a color correction is being performed based upon the sample area of the sample image 81c. The image processing device 1 can thus perform a color correction based upon sample areas of separate sample images for each of separate areas of one correction object image. In addition, the user is allowed to use the palette display area 81 so as to select sample images and sample areas to be used for the color correction.

As a method for the user to select sample areas to be used for the color correction from sample images having been displayed in the palette display area 81, the selection operation of the sample area shown in FIG. 4A, for example, may be performed at the palette display area 81. Or, the image processing device 1 may perform a color correction on the supposition that a preselected sample area has been dragged and dropped for the sample image when the user drags and drops the whole image of a sample image having been displayed as a thumbnail. Furthermore, the image processing device 1 may enlarge a sample image when the user hovers the mouse cursor over a thumbnailed sample image.

Figure 9:
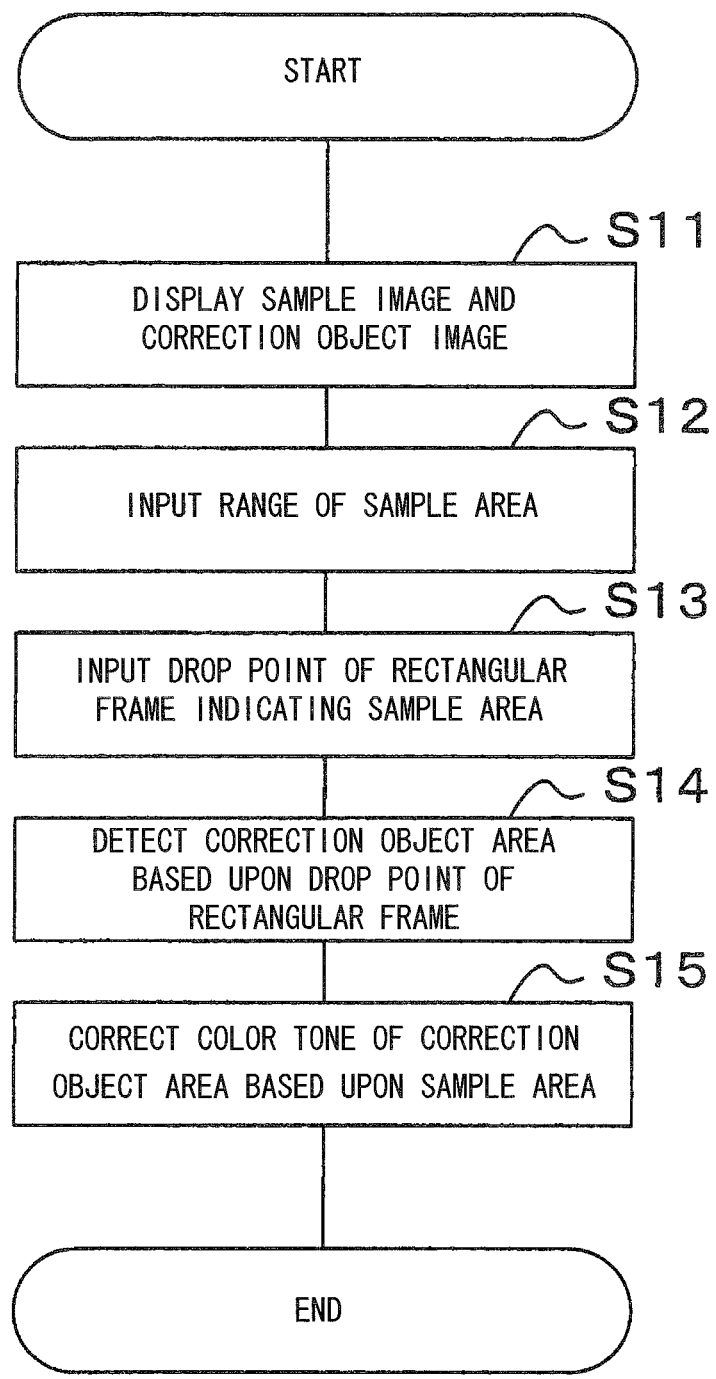
FIG. 9 is a flowchart of the color correction processing performed by the image processing device 1.

FIG. 9 is a flowchart of the color correction processing performed by the image processing device 1. The control program stored in the flash memory 12 stores the image processing program that contains instructions for causing the control circuit 11 to execute processing steps S11 to S15 of FIG. 9. The processing steps S11 to S15 progress sequentially by the control circuit 11 executing the image processing program. At first, in the step S11, the control circuit 11 reads out an image file from the HDD 14, and the display control unit 11a displays a sample image and a correction object image on the display device 17. In the step S12, the sample area reception unit 11b receives an operation signal indicating a range selection operation that is output from the input device 16. In the step S13, the correction coordinate reception unit 11c receives an operation signal, which is output from the input device 16, indicating a drag and drop operation having been performed to a sample area.

In the step S14, based upon the point at which a rectangular frame indicating the sample area was dropped, the correction area detection unit 11d detects a correction object area in which a color correction is to be performed. In the step S15, based upon the operation signal having been received by the sample area reception unit 11b, the color correction is performed by the color correction unit 11e. The object range for the color correction is the correction object area detected by the correction area detection unit 11d.

The following operations and advantageous effects can be achieved by the image processing device according to the first embodiment.

(1) When an operation signal indicating an operation of selecting a sample area from the area of a sample image and of dragging and dropping the same into the area of a correction object image is input to the sample area reception unit 11b and the correction coordinate reception unit 11c, the correction area detection unit 11d detects a correction object area and the color correction unit 11e performs a color correction to the image of the correction object area. As a result, the user can intuitively and easily perform a color tone unification of specific areas of the two images through the drag and drop operation.

(2) The display control unit 11a reflects the color correction performed by the color correction unit 11e and renders on the display device 17 the color tone of the image of the correction object area detected by the correction area detection unit 11d based upon the current cursor position while the cursor is being dragged from the sample area. As a result, the user is allowed to select the drop point while viewing the result of the color correction displayed in real time.

(3) When the control circuit 11 changes the position of the marker having been set by the correction coordinate reception unit 11c based upon an instruction from the user, the correction area detection unit 11d performs the color correction again based upon the changed position of the marker. As a result, the user is allowed to easily modify later the correction object area having already been set.

(4) Based upon the operation signal received by the correction coordinate reception unit 11c, the correction area detection unit 11d detects the area having a uniform texture and tone around the drop point as the correction object area. As a result, the user is allowed to simply point a single point so as to designate the range in which the correction is performed.

(5) When the control circuit 11 detects a change in the color tone of the sample area, the color correction unit 11e performs a color correction based upon the changed sample area to all the correction object areas associated with the sample area. As a result, the state in which the color tones of a plurality of images are unified can be maintained even if the sample image changes.

(6) The display control unit 11a displays a plurality of sample images on the palette display area of the display device 17 as thumbnails. As a result, the user is allowed to easily select the color used for the correction.

In the first embodiment described above, the operation that gives a modification to the sample area is reflected to the correction object image. In the image processing device according to the second embodiment described below, in addition to that, a modification to a correction object image is reflected to a sample image.

—The Second Embodiment—

Figure 10A:
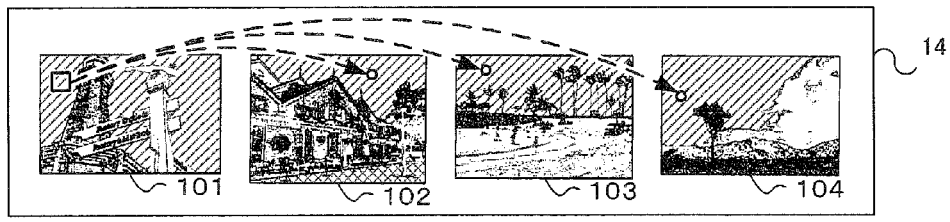
FIGS. 10A to 10E illustrate operations to reflect a modification of the correction object images to the sample image.

FIGS. 10A to 10E illustrate operations to reflect a modification of correction object images to a sample image. The explanation below assumes that as shown in FIG. 10A there are image data corresponding to a sample image 101 and correction object images 102, 103, and 104 in the HDD 14. Arrows in the figures represent that the sample image and the correction object images are associated. In FIG. 10A, the sample image 101 and each of the correction object images 102, 103, and 104 are associated.

Figure 10B:
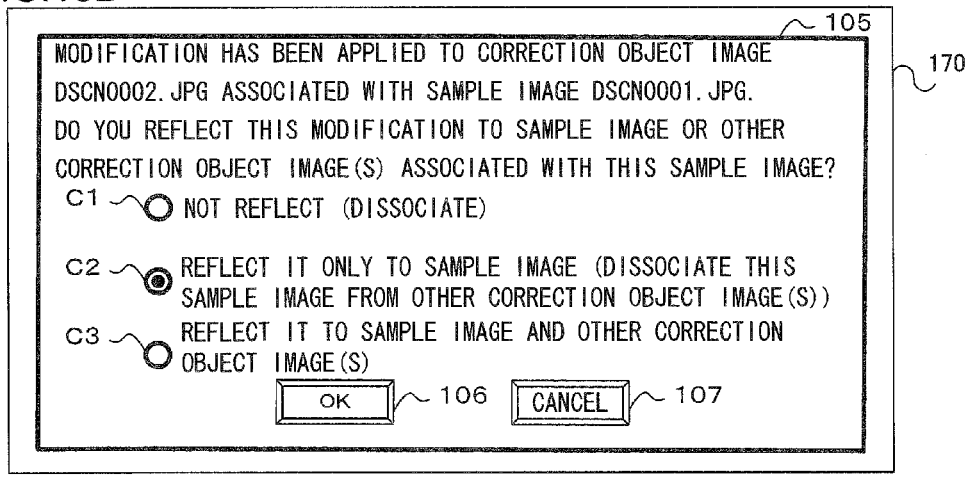

When the user performs an operation that changes the color tones of the correction object areas to the correction object images 102 to 104 of FIG. 10A, e.g. applying a variety of image filters to the correction object image 102, a dialogue 105 shown in FIG. 10B is displayed on the screen 170 of the display device 17 by the image processing device. On the dialogue 105, an inquiry message to the user is displayed as to whether or not the modification applied to the correction object image 102 is reflected to the sample image 101 and the other correction object images 103 and 104 associated with the sample image 101.

After displaying the dialogue 105 on the screen 170 of the display device 17, the image processing device receives an operation performed by the user to select any one of choices C1, C2, and C3. When the user selects one of the choices and presses an OK button 106, the image processing device 1 changes the states of the sample image 101 and the correction object images 102, 103, and 104 in response to the selected choice.

Figure 10C:
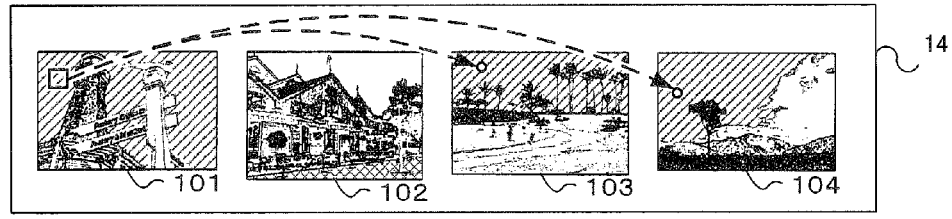

In the event that the choice C1 is selected, the image processing device does not reflect the modification applied to the correction object image 102 to the other images at all. When the choice C1 is selected, as shown in FIG. 10C, the image processing device puts the sample image 101 and the correction object image 102 into an unassociated state.

Figure 10D:
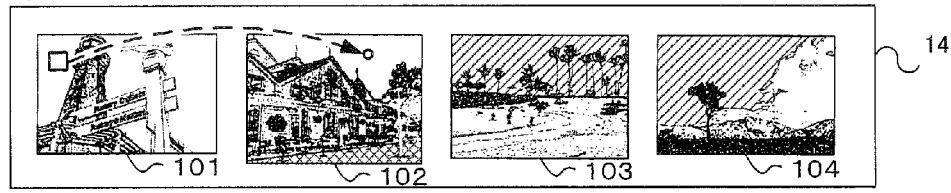

In the event that the choice C2 is selected, the image processing device reflects the modification applied to the correction object image 102 only to the sample image 101. When the choice C2 is selected, as shown in FIG. 10D, the image processing device puts the sample image 101 into an associated state with only the correction object image 102 and puts the sample image 101 and the correction object images 103 and 104 into an unassociated state. The image processing device further reflects the change in the color tone of the correction object image 102 to the sample image 101 so as to unify the color tones of the sample area and the correction object area.

Figure 10E:
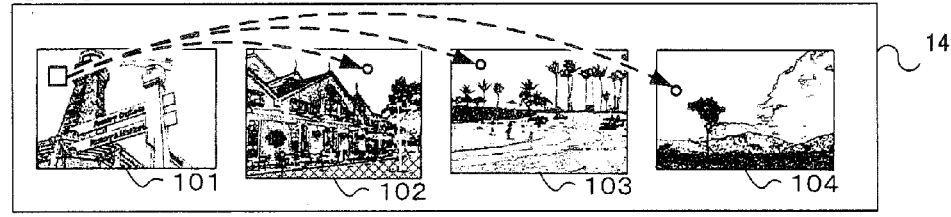

In the event that the choice C3 is selected, the image processing device reflects the modification applied to the correction object image 102 to the sample image 101 and reflects the new color tone of the sample image 101 to the other correction object images 103 and 104. When the choice C3 is selected, as shown in FIG. 10E, the image processing device does not change the association of the sample image 101 with the correction object images 102, 103, and 104. The image processing device further reflects the change in the color tone of the correction object image 102 to the sample image 101 and the other correction object images 103 and 104 so as to unify the color tones of these four images.

The user is allowed to press a cancel button 107 in place of the OK button 106. In the event that the cancel button 107 is pressed, the modification itself applied to the correction object image 102 is canceled. Even in the event that the user applies an unintended modification to the correction object image 102 due to incorrect operation or the like, the user is allowed to cancel the modification by pressing the cancel button 107.

The following operations and advantageous effects can be achieved by the image processing device according to the second embodiment, in addition to those achieved by the image processing device according to the first embodiment.

(1) In response to the change in a correction object area detected by the control circuit, a color correction based upon the changed correction area by the color correction unit is performed to a sample image and all the correction object images related to the sample image. As a result, the state in which the color tones of the related images are unified is maintained even if the correction object image changes.

In the first embodiment and the second embodiment described above, the sample image and the correction object image are associated one by one. In the third embodiment described below in detail, a sample image and a plurality of correction object images are allowed to be associated at a time.

—The Third Embodiment—

Figure 11A:
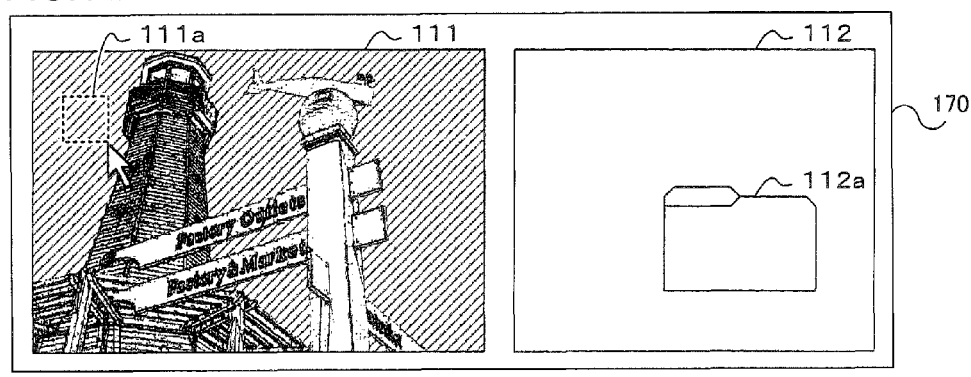
FIGS. 11A and 11B illustrate an operation to associate the sample image with a plurality of correction object images at a time.
Figure 11B:
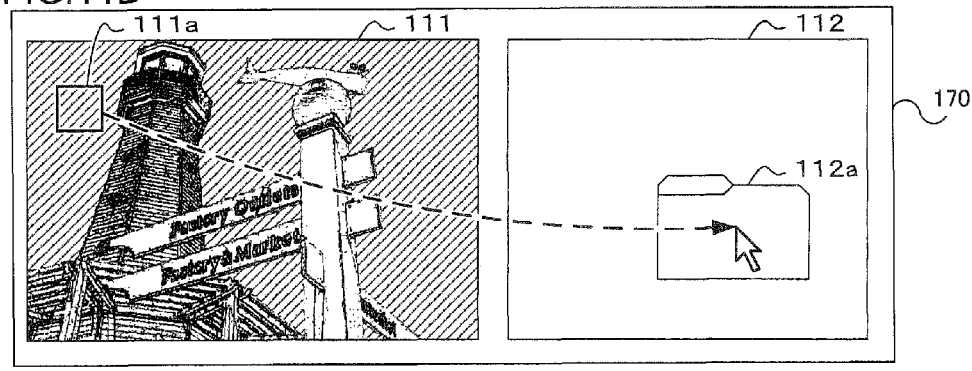

FIGS. 11A and 11B illustrate an operation to associate the sample image with a plurality of correction object images at a time. The explanation below assumes a configuration to display a sample image display area 111 and a thumbnail display area 112 on the screen 170 of the display device as shown in FIGS. 11A and 11B. Although the sample image display area 111 and the thumbnail display area 112 are displayed horizontally on the screen 170, the display format is not limited thereto.

In FIG. 11A, the thumbnail display area 112 contains a folder icon 112*a*. The folder icon 112*a* represents a group that includes a plurality of correction object images. When a plurality of correction object images are associated with the sample image at a time, the plurality of correction object images are grouped at first. After grouping the correction object images, the image processing device displays the folder icon 112*a*, which represents a group, on the thumbnail display area 112.

While the folder icon 112*a* is displayed on the thumbnail display area 112, the control circuit receives an operation signal indicating a drag and drop operation of the sample area into the folder icon. The operation signal is output to the control circuit by the input device when, for instance, the user instructs a drag and drop operation of a sample area 111*a* shown in FIG. 11B into the folder icon 112*a*, When the operation signal is received, the image processing device of the present embodiment performs a predetermined scene detection processing and detects correction object areas for each of the correction object images that belong to the group represented by the folder icon 112*a*. Then, the image processing device performs a color correction based upon the sample area 111*a* to each of the correction object areas.

The following operations and advantageous effects can be achieved by the image processing device according to the third embodiment, in addition to those achieved by the image processing device according to the second embodiment.

(1) When an operation signal indicating a drag and drop operation of the sample area to the folder icon representing that a plurality of correction object images are grouped that is output from the input device in response to an instruction from the user is input to the control circuit, the control circuit performs a predetermined scene detection processing to the plurality of correction object images that belong to the group and sets a correction object area to each of the correction object images. As a result, the user is allowed to perform the color tone unification of the plurality of images in a single operation.

The following variations are also within the scope of the present invention and any one of or plurality of the variations may be adopted in combination with the embodiments described above.

(1) A characteristic display indicative of the sample image may be performed when the sample image is displayed on the screen. For instance, an icon indicative of the sample image may be added to the image, and a frame border may be drawn in a predetermined color around the sample image. In addition, a characteristic display as above may be performed to the correction object image.

(2) The display methods of the image are not limited to those described in the embodiments. For example, not only the correction object image but also the sample image may be displayed as a thumbnail, and an image neither the sample image nor the correction object image may be displayed as a thumbnail.

(3) While an image is displayed as a thumbnail, based upon an operation signal output by the input device, the image displayed as the thumbnail may be enlarged on the screen. For instance, in the event that a mouse click is performed while the mouse cursor is positioned over the image displayed as the thumbnail, the image may be displayed larger than the thumbnail.

(4) The sample area may not be rectangular. For instance, it may be circular or a freehand-selected, closed area.

(5) Operations by which the sample area and the correction object area are selected may be performed using an input device other than the mouse. For example, these operations may be performed using a touch panel or the like.

(6) When the drag and drop operation shown in FIG. 7B is performed, a modification in the sample area may be reflected to the correction object image that is not displayed on the thumbnail display area. For instance, the modification in the sample area may be reflected to correction object images displayed side-by-side as in FIG. 2 and/or those in a state of being temporarily undisplayed.

(7) Also in the event that a modification other than a range change by moving the rectangular frame is applied to the sample area, the modification to the sample area may be reflected to the correction object image. For example, in the event that the contrast, the white balance, or the like of the whole sample image is modified, the color tone of the sample area changes accordingly. Therefore, the modification of the sample area may be reflected to the correction object image associated with the sample area.

(8) When the rectangular frame, which indicates the sample area, is dragged, similar to the case in which the marker which indicates the correction coordinates is dragged, the result of the color correction having been performed based upon the current cursor position in the correction object image may be displayed on the screen.

(9) Only sample areas of each of the sample images may be displayed side-by-side in place of a plurality of sample images displayed as thumbnails in the palette display area. In addition, not the sample areas themselves but colors extracted based upon the sample areas may be displayed as a color palette.

(10) The action to reflect the modification applied to the sample area to the correction object image, which is performed by the image processing device according to the first embodiment, and the action to reflect the modification applied to the correction object image to the sample image, which is performed by the image processing device according to the second embodiment, may be selectable. In this case, it would be acceptable that an instruction indicating that the user selects any of the actions is received before the image processing, or it would be acceptable that, every time a modification is applied to the sample area or the correction object image, an operation that the user selects whether or not to reflect the modification to the correction object image or the sample image is received.

(11) When the image processing device performs the scene detection processing, the correction object area may be automatically detected based upon the sample area, or it may be detected based upon an instruction given using a menu or the like by the user. For instance, in the event that the sample area is of a part of the sky, the area corresponding to the sky may be detected from the correction object image so as to be designated as the correction object area. It would otherwise be acceptable that some choices are displayed after a drag and drop operation is performed so that the areas to be detected are switchable in accordance with the content instructed by the user.

(12) When the operation signal indicating a drag and drop operation into the folder icon is received, the correction object area may be detected by processing other than the scene detection processing. For example, processing such as face detection processing, human detection processing, texture detection processing, or shape detection processing may be performed and based upon the result thereof the correction object area may be detected.

(13) An operation other than drag and drop may be performed into the marker indicating the drop point or the display frame indicating the sample area. For instance, it would be acceptable that, in response to a double click on the marker, a corresponding sample image is displayed, or it would be acceptable that an options menu with a variety of selectable operations is displayed.

Figure 12:
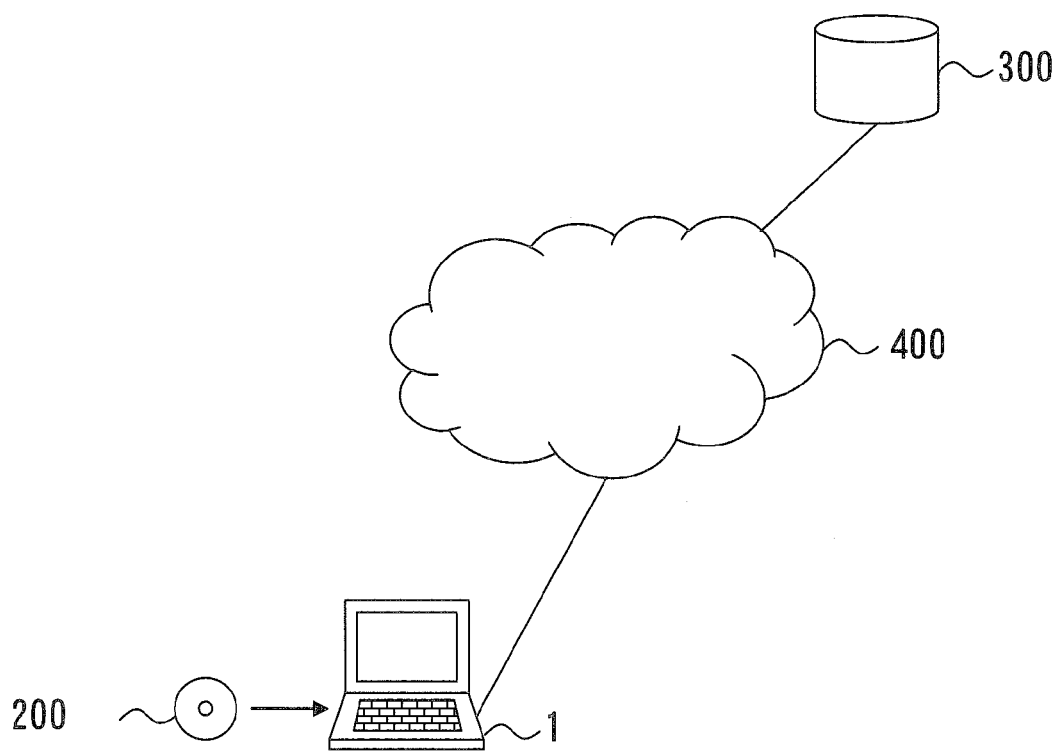
FIG. 12 illustrates an example of a supply configuration for the computer-readable computer program product containing an image processing program for performing image processing of an embodiment of the present invention.

(14) A computer program product for the control circuit of the image processing device to perform image processing in the embodiments and the variations described above is, as shown in FIG. 12, provided via a data signal transmitted through a storage medium 200 (for instance, a CD-ROM) or a communication network 400 (for example, the Internet). The image processing device 1 is provided with the image processing program via the CD-ROM 200. The image processing program may otherwise be provided in the following supply configuration. The image processing device 1 includes a connection function with the communication network 400. A server 300, which is a computer that provides the image processing program, stores the image processing program into a storage medium such as a hard disk. The server 300 embodies the image processing program read out from the hard disk on a carrier wave as a data signal so as to transfer it to the image processing device 1 through the communication network 400. As described above, it is preferable that the image processing program is supplied via computer program products in a variety of forms including a supply as a data signal through the storage medium 200 or the communication network 400.

(15) The image processing in each of the embodiments and variations described above is to be performed by the image processing program executed by the control circuit of the image processing device connected with an external devices such as a digital camera. However, the image processing program may be installed in the digital camera so as to use the digital camera as an image processing device in each of the embodiments and variations described above.

The present invention may be embodied in any way other than those described in reference to the embodiments as long as the features characterizing the present invention remain intact, and other embodiments which may be conceived of within the scope of the technical ideas of the present invention are also included within the scope of the present invention.

What is claimed is:

1. A non-transitory computer-readable storage medium with an executable program stored thereon, wherein the program instructs a microprocessor to perform the following instructions:
    an image display instruction for displaying a sample image and a correction object image on a display device;
    a sample area set instruction for setting a sample area in an area of the sample image;
    a reception instruction for receiving an operation signal which is output by an input device in response to an operation in which the sample area is dragged from the sample image into the correction object image and dropped in the correction object image, the operation signal indicating that the sample area has been dragged and dropped into a point in the correction object image;
    an association instruction for setting correction coordinates in an area of the correction object image based upon the point when the operation signal has been received by the reception instruction and for associating the sample area of the sample image with the correction coordinates in the area of the correction object image;
    a correction area set instruction for setting a correction area in the area of the correction object image based upon the correction coordinates; and
    a first color correction instruction for performing a color correction to an image of the correction area based upon the sample area of the sample image associated with the correction area;
    wherein the correction area set instruction includes a provisional setting of the correction area based upon a current position of the sample area being dragged;
    the first color correction instruction includes a performance of the color correction to the image of the correction area having been provisionally set by the correction area set instruction; and
    the image display instruction includes a display of the correction object image in which the color correction has been performed by the first color correction instruction.

2. The non-transitory computer-readable storage medium according to claim 1, further comprising:
    a modification instruction for modifying the correction coordinates, wherein:
    the correction area set instruction includes a setting of the correction area based upon the correction coordinates modified by the modification instruction.

3. The non-transitory computer-readable storage medium according to claim 1, wherein:
    based upon the correction coordinates, the correction area set instruction includes a detection of an area in which at least one of texture, color, and brightness is same and a setting thereof as the correction area.

4. The non-transitory computer-readable storage medium according to claim 1, wherein:
    the first color correction instruction includes a performance of the color correction so that a color tone of the correction area is same as a color tone of the sample area.

5. The non-transitory computer-readable storage medium according to claim 1, further comprising:
    a first change detection instruction for detecting a change in a color tone of the sample area; and
    a second color correction instruction for performing a color correction based upon the sample area to all correction areas in which an association with the sample area has been performed in response to a detection of the change by the first change detection instruction.

6. The non-transitory computer-readable storage medium according to claim 5, further comprising:
    a second change detection instruction for detecting a change in a color tone of a first correction area;
    a third color correction instruction for performing a color correction based upon the first correction area to the sample image related to the first correction area in response to a detection of the change by the second change detection instruction;
    a fourth color correction instruction for performing a color correction based upon the sample area to one or more correction areas, other than the first correction area in which the change has been detected by the second change detection instruction, among correction areas of all correction object images related to the sample area of the sample image based upon the color correction by the third color correction instruction; and
    a switch instruction for switching between the first change detection instruction and the second change detection instruction.

7. The non-transitory computer-readable storage medium according to claim 1, further comprising:
    a second change detection instruction for detecting a change in a color tone of the correction area;
    a third color correction instruction for performing a color correction based upon the correction area to the sample image related to the correction area in response to a detection of the change by the second change detection instruction;

a fourth color correction instruction for performing a color correction based upon the sample area to correction areas of all correction object images related to the sample area of the sample image based upon the color correction by third color correction instruction.

8. The non-transitory computer-readable storage medium according to claim 7, further comprising:
a selection instruction for selecting a correction object image to which the color correction by the fourth color correction instruction is not performed among a plurality of correction object images that have been associated with the sample area of the sample image based upon an input from the input device after the color correction by the third color correction instruction.

9. The non-transitory computer-readable storage medium according to claim 8, further comprising:
a dissociation instruction for putting all correction object images having been selected by the selection instruction into a state of being not associated with the sample area of the sample image.

10. The non-transitory computer-readable storage medium according to claim 1, wherein:
a plurality of sample images are displayed as thumbnails on the display device by the image display instruction.

11. The non-transitory computer-readable storage medium according to claim 1, further comprising:
a grouping instruction for creating a group by grouping a plurality of correction object images;
a group display instruction for displaying a symbol representing the group on the display device; and
an automatic set instruction for automatically setting the correction area to each of the plurality of correction object images included in the group, wherein:
the association instruction associates the sample area with the correction area that has been set by the automatic set instruction based upon a drag and drop operation to the symbol of the sample area by the input device.

12. A digital camera containing the non-transitory computer-readable storage medium according to claim 1.

* * * * *